United States Patent
Heinämäki et al.

(10) Patent No.: US 6,582,601 B1
(45) Date of Patent: *Jun. 24, 2003

(54) METHOD AND APPARATUS FOR SEPARATING SOAP

(75) Inventors: Pasi Heinämäki, Karhula (FI); Hannu Rönkönharju, Karhula (FI); Janne Vehmaa, Huutjarvi (FI); Olavi Pikka, Karhula (FI)

(73) Assignee: Andritz Oy, Helsinki (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/484,425

(22) Filed: Jan. 18, 2000

(51) Int. Cl.[7] ............................................. B01D 17/032
(52) U.S. Cl. ................................. 210/532.1; 210/540
(58) Field of Search ................................. 210/528, 538, 210/540, 776, 800, 532.1

(56) References Cited

U.S. PATENT DOCUMENTS

| | | | | |
|---|---|---|---|---|
| 4,154,678 A | * | 5/1979 | Kole | |
| 4,208,286 A | | 6/1980 | Kauppi | 210/528 |
| 4,358,374 A | | 11/1982 | Morva et al. | 210/242.3 |
| 4,601,833 A | * | 7/1986 | Shubert | 210/744 |
| 4,867,872 A | * | 9/1989 | Russell et al. | 210/776 |
| 4,883,602 A | * | 11/1989 | Anderson | 210/776 |
| 5,015,393 A | * | 5/1991 | Russell et al. | 210/776 |
| 5,137,643 A | | 8/1992 | Keyes et al. | 210/776 |

FOREIGN PATENT DOCUMENTS

WO   WO 98/29524   7/1998   ............ C11B/13/02

* cited by examiner

Primary Examiner—Robert Popovics
(74) Attorney, Agent, or Firm—Nixon & Vanderhye P.C.

(57) ABSTRACT

A method and apparatus for separating soap from liquor in a filtrate tank are particularly well suited for treating soap-containing filtrates from digester houses, bleach plants, and washer rooms in the chemical pulp processing industry. A device is disposed in the filtrate tank for generating a horizontal draw between the soap collecting devices and the soap.

10 Claims, 6 Drawing Sheets

(A-A)

(A-A)

METHOD AND APPARATUS FOR SEPARATING SOAP

BACKGROUND AND SUMMARY OF THE INVENTION

The present invention relates to a method and apparatus for separating soap from liquor in a filtrate tank. The method and apparatus according to the invention are particularly well suited for treating soap-containing filtrates from digester houses, bleach plants and washer rooms in the chemical pulp processing industry.

Soap appears primarily in the liquor leaving either the digester or the subsequent washing equipment. Such liquor is called weak black liquor and, besides cooking chemicals, it also contains various organic and inorganic materials dissolved in liquor during pulping. It has been estimated that these materials represent about 12 to 18 percent of the black liquor by weight. Part of these materials precipitate on the surface of the liquor, in the form of soap, the maximum density whereof is only a little lower than that of the liquor. The soap density ranges widely, from 0.98 kg/l down to 0.005 kg/l. According to a reference, a constituent is referred to as soap if its density is higher than 0.1 kg/l and as foam if its density is lower than that. When the soap density is at the maximum, there is not much difference between the soap and liquor densities, whereby the major portion of soap lumps, lumps being the form of soap when it is at its heaviest, remains below the liquor surface.

From the digester or the subsequent washing equipment, weak black liquor is discharged into a filtrate tank. Filtrate tanks are so large, their diameters being of the order of 8 to 16 m and volumes of about 400 to 4000 m$^3$, that the retention time of black liquor in the tank is relatively long. This provides the soap with an excellent opportunity to separate from the liquor and to accumulate on the surface thereof. One purpose of the large tank is to serve as a buffer in production fluctuations. Another purpose is to separate both the gas and the foaming soap from the liquor in order to be able to recirculate a substantially gasfree and soapfree black liquor back to the process, either through chemical recovery or in some other appropriate manner. In some cases, soap accumulates on the liquor surface, forming a layer, which may be even dozens of centimeters thick. Depending on mainly the density of soap, but also on the composition (on how much black liquor is contained in the soap), the form and behavior of soap may vary considerably. If soap is relatively free of black liquor, the soap material becomes viscous, sticky, sometimes lumpy and difficult to move. Such material easily clogs pipes, valves and other soap-treating devices. On the one hand, a soapy foam containing plenty of gas requires a large storage volume in order to ensure that foam cannot escape through ventilation ducts out of the filtrate tank. On the other hand, if soap is stored in the filtrate tank for too long, the soap density may increase to such an extent, when liquor separates therefrom, that the soap will sink into the liquor mass and be carried therewith to the evaporators of the recovery plant. Presence of soap would substantially disrupt the operation of the evaporation plant. For these reasons, it is important that soap be discharged from the tank according as it accumulates on the liquor surface.

As an example of soap separation equipment of prior art, a system based on overflowing deserves to be mentioned. In that arrangement, the tank was overflowed, by allowing a soap fraction to flow over the edges of a special chute or the tank, directly into a sewer. It is clear that this is not possible today, for both environmental and economical reasons. On the one hand, soap must not end up in water systems and, on the other hand, it is possible to prepare, e.g., tall-oil from the soap fraction separated in the tank. In slightly more advanced soap separation systems, the wall of the filtrate tank is arranged with outlets. The idea is to discharge the soap fraction through these outlets and then pump it for further treatment. The great variation of the filtrate level in the filtrate tank is, however, problematic, because it makes it impossible for the operator to know the soap level in the tank, even though the tank were provided with outlets at several heights. This is further complicated by the fact that one never knows, outside the tank, how thick the layer of soap is on the black liquor surface. In other words, it may happen that practically mere liquor is pumped out of the tank for further treatment of soap.

In the worst case, soap sinks into the black liquor, whereby it may end up, e.g., in the evaporation plant and more or less disrupt its operation, depending on the type of the evaporation plant. For example, in such evaporator arrangements in which the material to be evaporated flows along the inner surface of evaporator tubes, soap lumps may clog the entire evaporator tube.

Another way of separating soap is to arrange several filtrate tanks in series, one of which is allowed to overflow so that the soap fraction is separated by the overflow and the black liquor is pumped further to another tank. This arrangement is expensive, though, because of both the tanks and the instrumentation needed. In this arrangement, the main role is played by the level adjustment of the first, so-called soap tank, which level is to be optimal in view of the overflow. In other words, the overflow has to be adjusted in such a way that as little as possible of black liquor is entrained with the soap, yet so, that the soap is efficiently separated in the soap tank.

Prior art also involves many "freely" floating soap separating systems, in which ballast is used in order to cause a soap separation funnel or equivalent to partially submerge in the liquor so that light soap will flow into a recovery pipe from one end thereof. The pipe has to be sufficiently large, though, in order to prevent soap from clogging it. The pipe itself constitutes a problem because it also serves as a float, in most cases even more efficiently than the float itself. As soap then flows into the pipe at a varying speed, which is characteristic of it, the weight of the pipe changes and the pipe starts to sink deeper and deeper into the soap/liquor. To avoid this, the funnel should either be arranged so high up in the soap layer that heavy soap could not enter the funnel, which would result in the soap ending up to the recovery system with the consequences described above, or the position of the funnel should be monitored and ballast adjusted in accordance with the position of the funnel, so that the funnel would always be in a certain depth in relation to the liquor level. Practically, this is however impossible because there is no way of accurately defining the position of the liquor level. The weight of the soap in the funnel or outlet duct, which directly and, in any case, adversely affects the floating depth of the soap separating funnel, is not reckoned with in any of these freely floating soap separating arrangements.

A soap skimmer is disclosed in, e.g., U.S. patent publication 5,137,643. It separates soap from the surface of the soap tank. The operation is based on a soap skimmer being arranged to rest on at least two floats on the surface of liquor in a filtrate tank. One of the floats, i.e., a so-called top float is arranged to float at least partially submerged in a layer of soap and the other, i.e., a so-called bottom float is arranged to float either solely in soap or partially submerged in black liquor. The top and bottom floats are connected with a hanger plate, which maintains a predetermined distance therebetween. A soap inlet opening is arranged in the bottom float, said inlet opening leading into a soap outlet pipe. The outlet pipe is provided with a vacuum effect to draw soap from the surface of black liquor into the pipe. In other words, since the bottom float with the soap outlet is submerged in soap, soap which is drawn by the vacuum effect flows continuously through the outlet opening into the outlet pipe. Furthermore, the above-described floating assembly is hinged to a swing arm, one end of the swing arm being hinged to the bottom of the tank. The swing arm is used for controlling the movement of the floating assembly as the liquor level varies in the tank.

A drawback of all the prior art means described above is that in all of them the outlet funnel, outlet chute or outlet opening stays in place on the surface of black liquor; in some cases it moves transversely only if the level of black liquor changes. Consequently, there is no other way for the soap to flow into the funnel or, more broadly, to the outlet, than from the vicinity of the outlet opening. The longer the distance from the outlet opening, the more certain it is that soap remains for a long time in the tank. This involves a risk that the soap will sink and end up in the recovery system.

Another drawback already discussed above is free buoyancy of the soap separating means, whereby the weight of soap in the outlet funnel or outlet pipe has an influence on the floating depth of the funnel as well as on its capacity to remove soap from the tank.

The method and apparatus according to the present invention eliminates, e.g., the above-described problem so that the soap outlet opening or equivalent and the soap which is floating on the surface of black liquor are brought into a motion relative to each other, so that it is possible to reliably remove the soap from the entire cross-sectional area of the tank without any risk of the soap remaining for too long in the tank. Furthermore, as no floating soap separation device is used in the present invention, uneven flow of soap into the apparatus does not cause any problems.

It is also characteristic of a method and apparatus according to the invention that soap and the soap outlet opening are brought into a motion relative to each other so that the surface layer of the soap is mixed as little as possible. This is achieved by effecting relative motion without substantially touching the surface layer of the soap.

According to one aspect of this invention there is provided a method of separating soap from liquor in a filtrate tank, comprising: (a) Introducing soap-containing liquor into a filtrate tank. (b) Allowing a soap-containing fraction to separate onto the surface of liquor in the filtrate tank. (c) Introducing the soap-containing fraction into a soap separating assembly while effecting a horizontal draw between the soap fraction and the soap separating assembly so that the introduction of soap fraction into the soap separating assembly is intensified. And, (d) discharging the soap-containing fraction from the tank substantially separately from the liquor. Preferably (a) is practiced using as the soap-containing liquor a soap-containing filtrate from a digester house, bleach plant, or washer room in the chemical pulp processing industry.

According to another aspect of the invention there is provided an apparatus for separating soap from liquor in a filtrate tank comprising: a filtrate tank; a device which introduces liquor into the filtrate tank; a device which skims the foam fraction from the liquor surface in the tank; a device which forms a reciprocal horizontal draw between the soap fraction and the soap separating assembly; and means for discharging the soap fraction from the tank.

Other features characteristic of the method and apparatus according to the invention are seen from the appended claims.

DETAILED DESCRIPTION OF THE DRAWINGS

Figure 1:
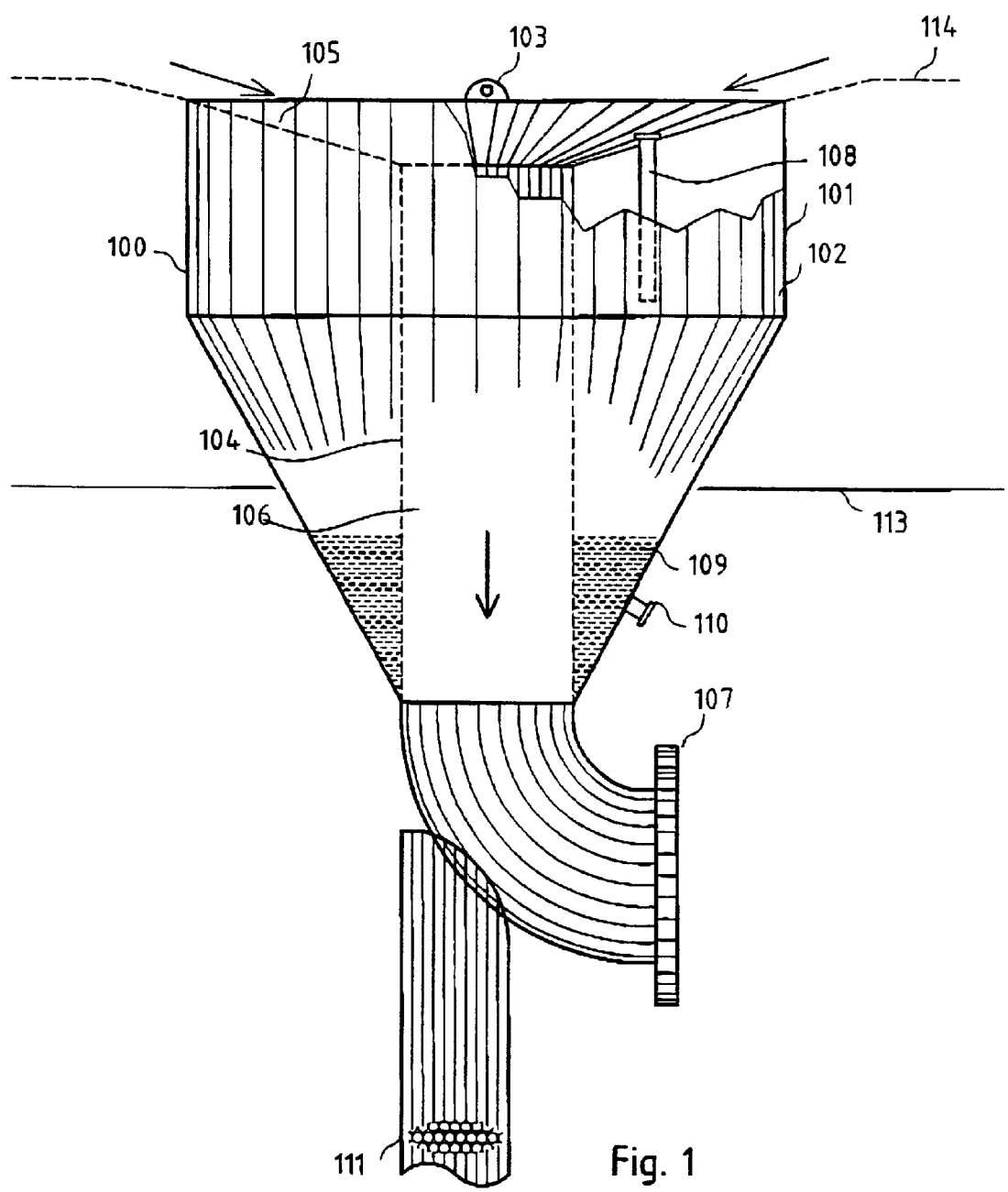
FIG. 1 is a n illustration of a soap separation apparatus of prior art.

An apparatus for separating soap according to prior art, as shown in FIG. 1 and disclosed in U.S. patent publication 5,137,643 comprises a floating assembly 100, which comprises a floater chamber 101 with a hollow inner portion 102. The floating assembly further comprises a soap pipe 104, which is positioned centrally inside the floater chamber 102 to allow soap to flow along a flat funnel path 105 into a soap pipe 104 and therethrough further to the soap outlet 107. The floating assembly further comprises necessary means (pipe 108) for filling the hollow inner portion of the floater chamber 101 with water and means (conduit 110) for draining water out of it. Furthermore, the assembly 100 comprises a ballast container 111, which is filled with, e.g., lead pellets or equivalent.

The floating assembly 100 is designed to float on the surface 103 of black liquor. The floating depth of the assembly 100 is adjustable by increasing or decreasing the amount of water inside the floater chamber. The soap level 114 has to be slightly higher than the edge of the funnel portion 105 so as to allow soap to flow into the pipe 104. A problem with the assembly according to FIG. 1 is, however, that soap flow into the soap pipe is allowed from the top portion of the assembly, only. This means that the soap floating directly on the surface of black liquor and partially even submerged therein is not allowed to flow out of the tank at all, in this assembly. Another problem is that the soap separating arrangement in accordance with FIG. 1 is capable of removing soap only from the vicinity of the outer edges of the funnel 105. This is because the capability of soap of moving on the surface of black liquor towards the separating arrangement is very limited, especially, if the heaviest soap fraction is not at all removed.

Figure 2:
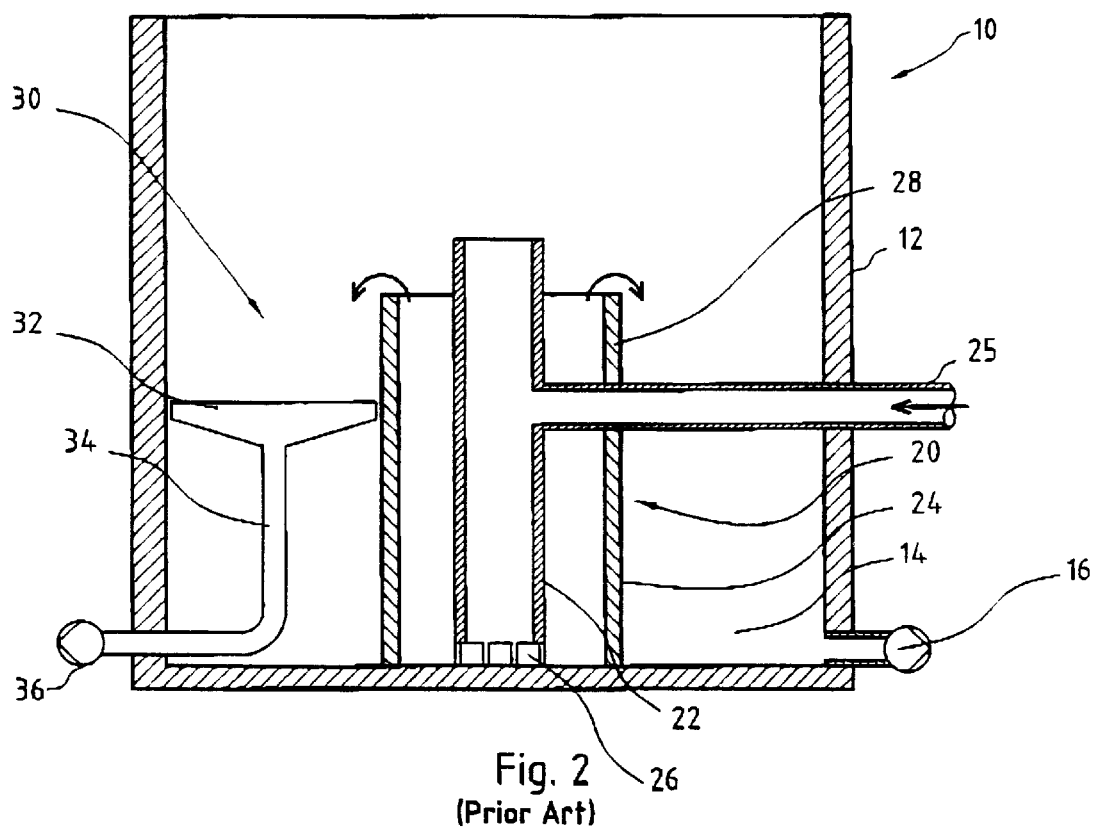
FIG. 2 is an illustration of a soap separation assembly of prior art.

FIG. 2 illustrates a prior art filtrate tank 10, with at least one so-called deaeration cylinder 20 arranged therein. The cylinder 20 may be arranged centrally inside the tank 10, but it is also possible that it is not positioned on the axis of the tank 10, but more or less aside thereof. If more than one cylinder 20 is involved, they are arranged in a scattered manner, apart from each other in the tank 10. In the arrangement of FIG. 2, the deaeration cylinder 20 is positioned on the centerline of the tank 10. The cylinder 20 comprises an inner pipe 22, whereinto soap-containing filtrate is passed through a pipe 25. The inner pipe 22 is designed to bring the filtrate into a circular motion in order that air and other gases would be separated from the filtrate and be discharged through the top portion of the inner pipe 22 to the gas treatment. The deaeration cylinder 20 also comprises a so-called outer pipe 24 arranged outside the inner pipe 22, said outer pipe being in contact with the inner space of the inner pipe 22 through openings 26 arranged at the bottom end of the inner pipe 22. The filtrate, wherefrom air/gas has been removed, flows through these openings into the outer pipe 24, over the top edge whereof the filtrate flows to a soap separating space 14; i.e., to the space 14 between the outer pipe 24 and the jacket 12 of the tank 10. The soap separating space 14 is provided with a soap separation assembly 30. According to prior art, the assembly 30 may be either completely stationary or rest on floaters. The soap separation assembly 30 comprises a soap separating chute or funnel 32, wherefrom a flow path 34 leads to a discharging pump 36, which discharges soap fraction. The filtrate wherefrom soap has been separated is pumped for further treatment from the space 14 with a pump 16.

Figure 3:
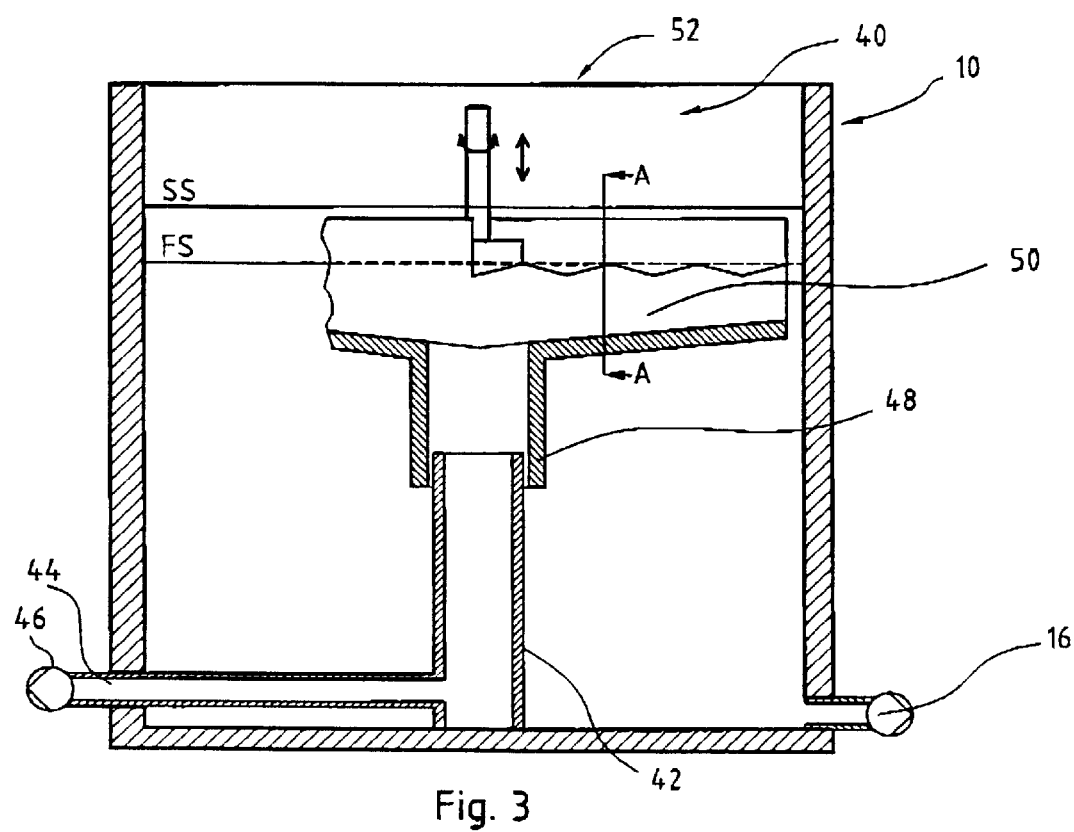
FIG. 3 is a schematic illustration of a soap separation assembly in accordance with a preferred embodiment of the invention.

A solution is provided, e.g., to the problems set forth above in this description, by a soap separating assembly 40 disposed inside a filtrate tank 10 in accordance with a preferred embodiment of the invention, shown schematically in FIG. 3. In accordance with this embodiment, the assembly is preferably disposed centrally in the filtrate tank 10. The soap separating assembly 40 preferably comprises a substantially vertical pipe 42 fixed to the bottom of the tank 10, a pipe 44 departing from said pipe 42 and leading out of the filtrate tank, and a pump 46 in connection with the pipe 44 outside the tank. The soap separation assembly 40 also comprises a vertically movable pipe 48 arranged in a telescopically sliding manner in connection with said pipe 42. In connection with said pipe 48 is preferably arranged a two-sided, symmetrical chute 50 extending substantially to the wall of the tank 10 or in the vicinity thereof. The bottom of the chute 50 is inclined, as shown in FIG. 3, leading the soap flowed into the chute 50 to the movable pipe 48, and further via the stationary pipe 42 and the pipe 44 out of the tank to the pump 46, which then pumps the soap-containing fraction for further treatment.

FIG. 3 also illustrates how the upper end of the movable pipe 48 is, in this embodiment, connected with drive equipment 52, which moves both the pipe 48 and the chute attached thereto. In accordance with a preferred embodiment of the invention, the pipe 48 and the chute 50 are moved vertically, for example, with a pneumatic cylinder. The purpose of this is to follow the filtrate surface by means of the chute in such a manner that the level of the chute 50 relative to the filtrate surface FS is always the same. The filtrate surface FS is monitored in ways known per se, for example, by either gamma detectors, hydrostatic level detectors or with, e.g., a separate float arrangement. In practice, all above-mentioned measuring modes give a measuring value, which is proportional to the filtrate surface FS. However, when the assembly 40 is taken into use, the control system of the drive equipment 52 has to be separately calibrated so that the filtrate surface FS is positioned in an optimal status relative to the chute 50. After calibration, the variations of the filtrate surface indicated by the measuring system can be directly adjusted to be changes in the elevation of the chute. Another way of adjusting the chute elevation could be adjustment based on the flow of pump 46. This is based on the assumption that the flow entering the tank is constant in the normal operating state of the process. Thereby, by maintaining the flow of the pump 46 constant at a certain rating, also the filtrate surface stays constant. If the flow of the pump 46 has to be changed, the change would control also the actuator changing the chute elevation.

FIG. 3 also shows how the drive equipment 52 may also rotate the soap separating assembly 40, for example, by means of a hydraulic electric motor. Such arrangement is particularly suitable if pipes 42 and 48 are centrally arranged in the filtrate tank 10. In this case, a rotatable chute arranged on the diameter of the tank is capable of covering the cross-sectional area of the entire tank.

It has to be also noted that the present invention is not limited to either of the above-described arrangements; in other words, the present invention makes it possible to use both the level adjustment of the chute and rotation of the chute, only one of these alternatives, or in a case neither of these alternatives.

FIG. 3 also shows how soap accumulates on the filtrate surface FS in the tank 10. The top surface SS is essentially higher than the filtrate surface FS. The soap density changes, i.e., the soap becomes lighter when approaching the surface SS. Although the introduction of liquor into the tank is not shown in FIG. 3, it may be effected either by applying the prior art way according to FIG. 2 or in some other appropriate manner. A novel mode is disclosed in FIGS. 8a and 8b.

Figure 4:
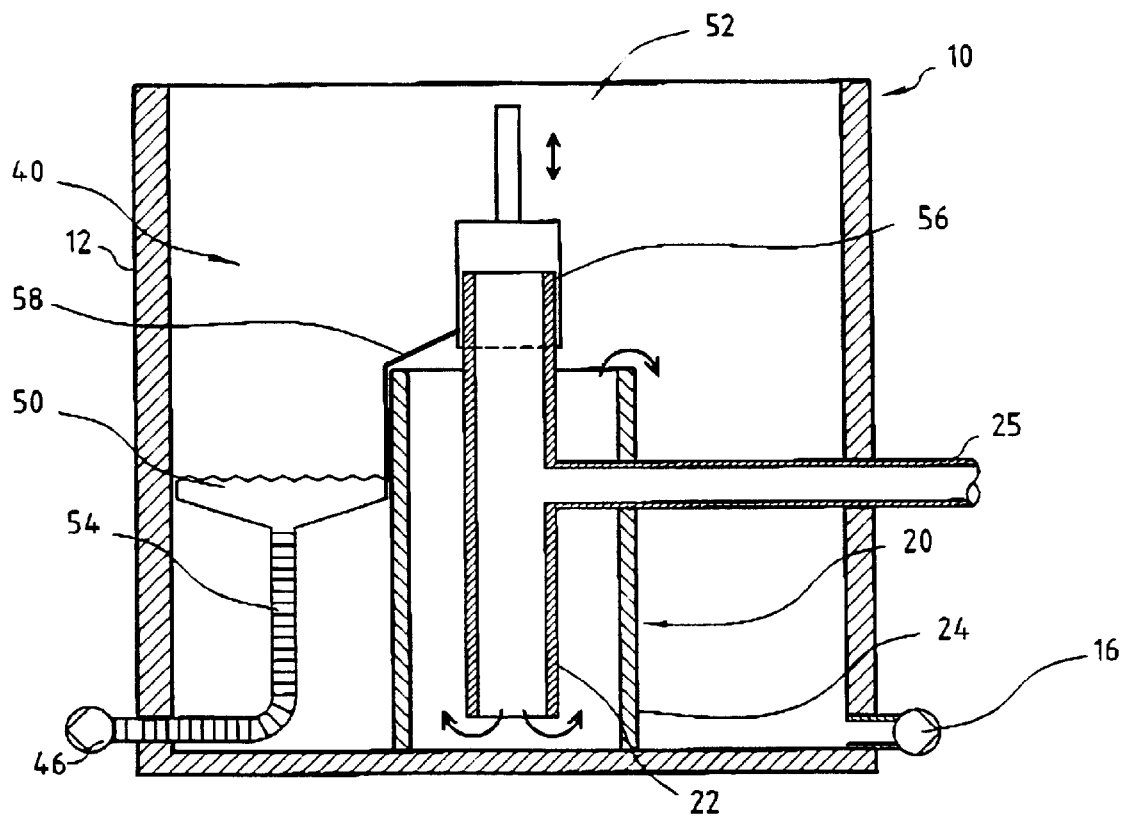
FIG. 4 is a schematic illustration of a soap separation assembly in accordance with a second preferred embodiment of the invention.

FIG. 4 illustrates an arrangement in accordance with another preferred embodiment. This arrangement is primarily applicable to a situation in which it is desirable to provide a deaeration cylinder 20 of an existing tank 10 with a soap separating assembly 40 in accordance with the invention. In this embodiment, the soap separating assembly 40 comprises a chute 50, a soap outlet pipe 54 with a pump 46 and drive equipment 52. The drive equipment 52 is arranged at the upper end of the inner pipe 22 of the deaeration cylinder in such a manner that the pipe 22 is provided with a sliding piece 56 which is driven, for example, by a pneumatic cylinder (not disclosed) fixed to the cover of the tank 10 or equivalent structures at the upper end of the tank. The sliding piece 56 has a protruding support 58, and the chute 50 is suspended thereon. Thus, the chute 50 is vertically movable by means of the sliding piece. If desired, the chute may be supported relative to the wall 12 of the tank 10 as well, for example, by means of guide bars, slide bars, or some suitable roller arrangements. The drive equipment moving the chute 50 vertically may be positioned also in the middle of the chute, whereby the chute 50 can be supported at both ends thereof with appropriate sliding arrangements. Besides half of the diameter of tank 10, as shown in FIG. 4, the chute may also extend to the entire diameter thereof, in this embodiment, whereby the number of outlet pipes 54 needed is correspondingly two. For example, flexible steel hoses available today are applicable to be used as an outlet pipe, for compensating the variations of the filtrate level.

Figure 5:
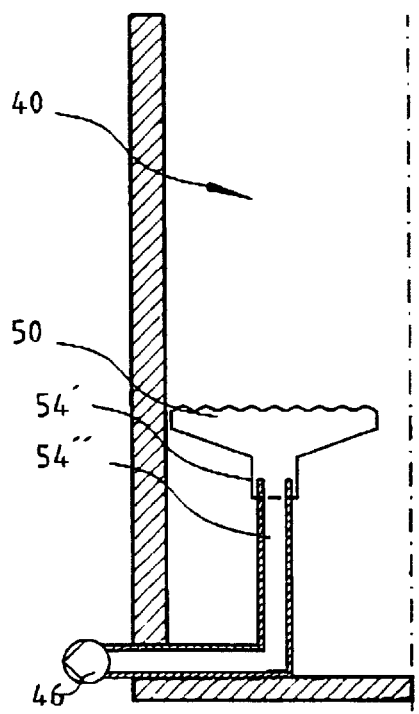
FIG. 5 is a schematic illustration of an alternative arrangement for a detail of a preferred embodiment shown in FIG. 4, FIGS. 6a and 6b illustrate soap skimmers in accordance with a third and fourth preferred embodiments of the invention, taken as a sectional view A—A of FIG. 3.

FIG. 5 illustrates another alternative for arranging soap removal from the chute 50. In this embodiment, the outlet pipe 54 is composed of two parts: a stationary, substantially vertical portion 54" connected, for example, to the bottom of the tank 10, and a portion 54' which is vertically movable in relation to the portion 54" and connected to the chute 50. This embodiment makes it possible to move the chute 50 in the vertical direction in the same way as the embodiment illustrated in FIG. 4.

In the above Figures, the bottom of the chute is descending towards its middle area because the soap outlet pipe is arranged in the middle area of the chute. In many cases, this is the most optimal location for the outlet pipe, but in some cases, for structural or other reasons, the outlet pipe has to be located nearer to one end of the chute or even at one end thereof.

Figure 6A:
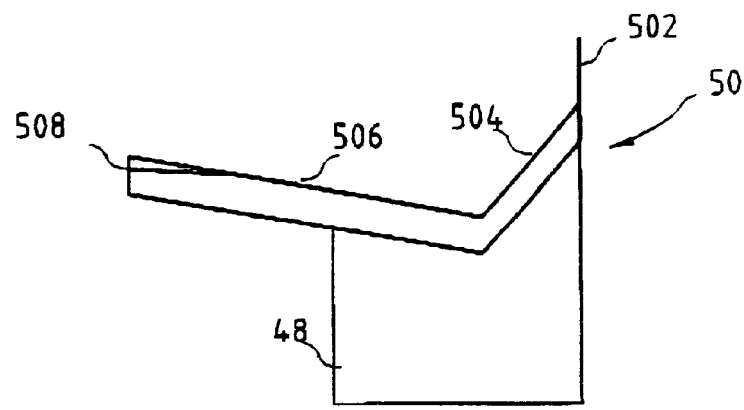
Figure 6B:
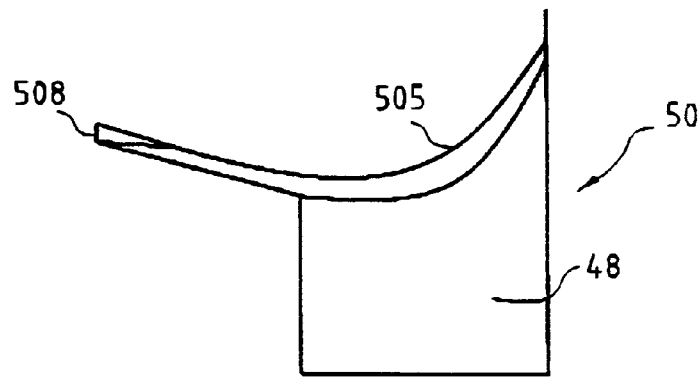
Figure 7:
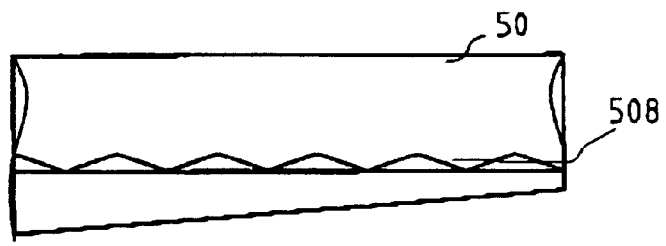
FIG. 7 illustrates a structural arrangement for a lip edge of a soap skimmer in accordance with a fifth embodiment of the invention.

FIG. 6a is a slightly more detailed illustration of the structure of a chute 50 in accordance with a preferred embodiment. Chute 50 comprises a back plate 502, which is substantially vertical in the embodiment of FIG. 6a, an inclined bottom plate 504 and a front plate 506 and a lip 508 arranged at the front edge of the front plate 506. Preferred structural arrangements for the chute 50 are, besides the chute being inclined towards the outlet pipe 54, also the back plate being 502 sufficiently high so that it extends above the surface SS of soap foam (shown in FIG. 3) in practically all running situations of the tank. However, especially when the draw between the chute and soap is very small, it is even possible to make the chute symmetrical relative to its longitudinal axis, i.e., soap is allowed to flow in from either side to the chute. It is also advantageous that the bottom of the chute 50 is composed of at least two levels (504 and 506) as shown in FIG. 6a or that the bottom of the chute is curved (FIG. 6b). This is useful in order that soap could not stick to any point of the chute and thereby slow down the flow of soap towards the outlet pipe 54.

Both FIGS. 6a, 6b and 3 and 4 illustrate a structural arrangement for the lip 508 of the chute 50 in accordance with a preferred embodiment. The end of the lip 508 is either wavelike or bent into a zigzag shape. The purpose of this bending is to ensure that the soap lumps on the surface of black liquor end up into the chute 50. A limited flow area on the level of black liquor surface at the lip of the chute 50 brings about a faster flow, which more efficiently draws the soap lumps into the chute 50. At the same time, also small directional faults of the chute are compensated. In other words, if the lip edge of the chute is not completely horizontal, the chute will function any way. If it is desirable to emphasize this aspect, it is possible to convert the serration of the chute lip such that the lip is provided with deep, e.g., rectangular openings, which naturally allow for bigger directional faults than a relatively low-gradient serration.

As for the location of the chute 50 relative to the black liquor and the soap layer floating thereon, it is advantageous to arrange the chute lip 508 in such a manner that it is substantially on the same level with the black liquor surface FS (FIG. 3). If the lip 508 is wavelike or serrated as shown in FIG. 6, it is advantageous that the black liquor surface FS is substantially on the mid-level of the waves. The lip portion 508 may also be arranged with a plurality of adjacent flow paths and flow obstacles therebetween. In other words, the lip portion is so formed that soap lumps have enough space to find their way into the chute 50 along with the flow, from the bottom points of the waves along said flow paths. As mentioned above, at least the considerable draw between the soap layer and the chute should be taken into account when dimensioning the back plate of the chute 50, so that the back plate will extend at least substantially to the level of the soap foam top surface SS in order to prevent leaking over the chute 50. Adjustment of the actual elevation of the chute 50 relative to the filtrate surface FS has been described above. A characteristic of the invention is that the elevation of the chute in the tank 10 is adjusted in a forced manner so that potential and even probable variations in the weight of the outlet system are prevented from influencing on the elevation of the chute.

Figure 8A:
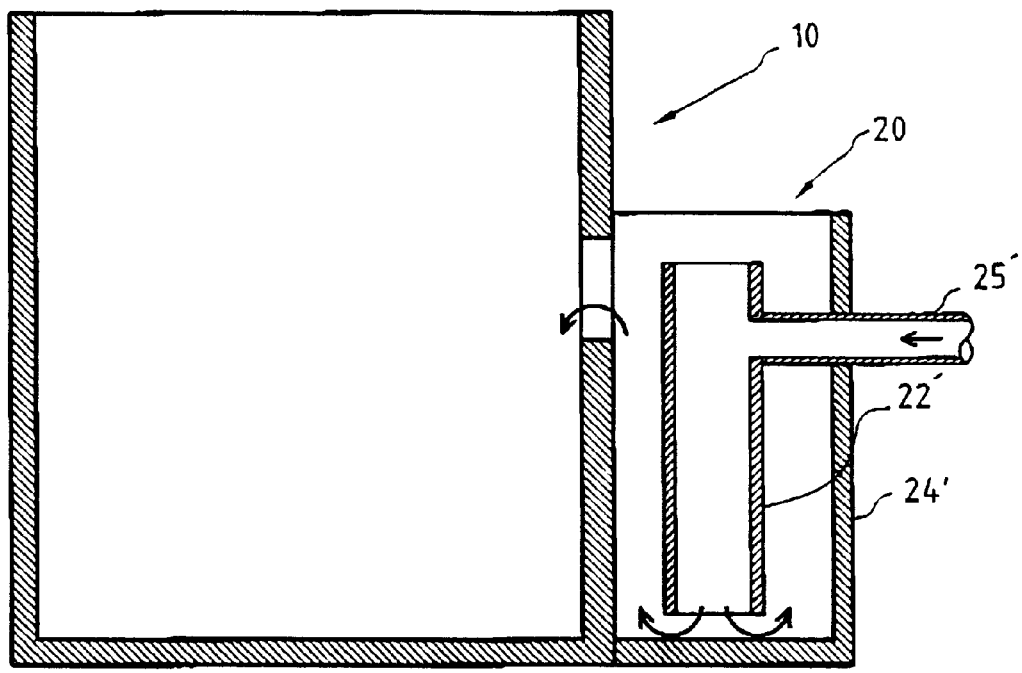
FIGS. 8a and 8b illustrate a novel type of a filtrate tank in accordance with a sixth preferred embodiment of the invention.
Figure 8B:
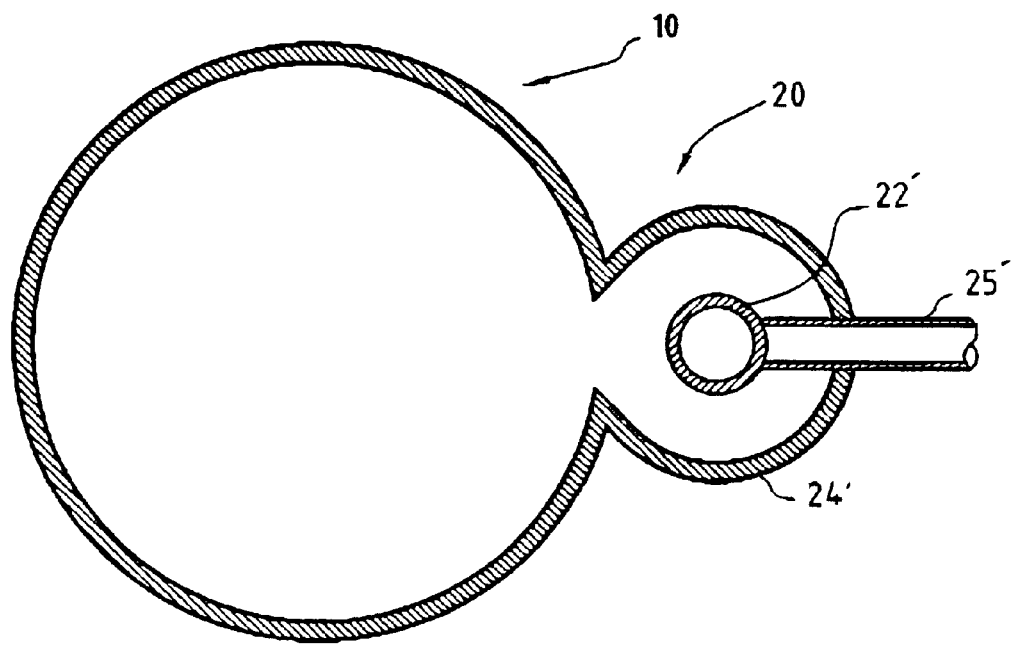

FIGS. 8a and 8b illustrate a novel type of a filtrate tank which is particularly well suited for operation with a soap separation assembly 40 illustrated in FIG. 3. In the embodiment of FIGS. 8a and 8b the deaeration cylinder 20 has been transferred completely outside of an essentially cylindrical filtrate tank 10. The structure and operation of the deaeration cylinder 20 itself is the same as in prior art arrangements. Only the location is new. However, the location described gives an opportunity to an especially efficient soap separation. This is because now it is possible to use a rotatable chute system illustrated in FIG. 3 as one embodiment. Furthermore, the arrangement shown in FIG. 8 is especially energy-effective in view of the arrangements shown in subsequent FIGS. 9a and 9b for circulating the surface layer of the filtrate from the tank.

As stated hereinabove, it is characteristic of the present invention that a draw is developed between the chute and the soap floating on the surface of black liquor, or more broadly, filtrate. This may be carried out either by moving the chute relative to the black liquor in the filtrate tank (shown in FIG. 3) or so that at least the surface layer of the black liquor in the tank 10 is brought into a movement relative to the chute. In both cases, the direction of movement is such that the lip portion 508 of the chute 50 receives the soap from the surface of the black liquor and tends to skim the soap inside the lip portion.

Figure 9A:
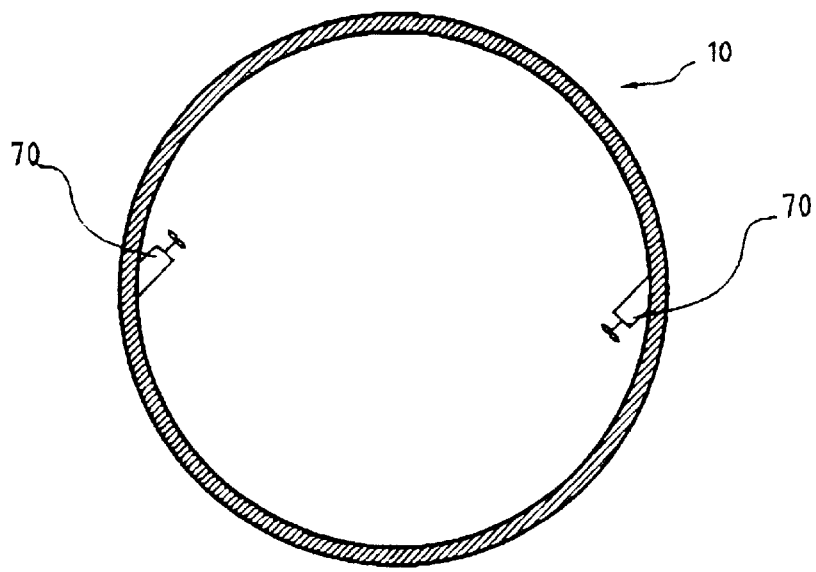
FIGS. 9a and 9b illustrate a filtrate tank in accordance with a seventh preferred embodiment of the invention.
Figure 9B:
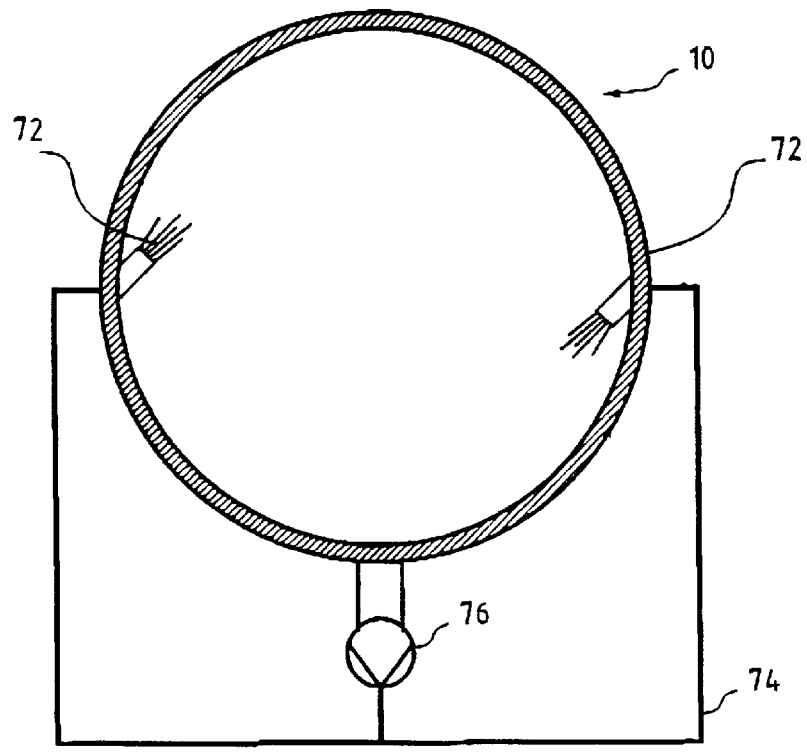

FIGS. 9a and 9b show how the above-described circular motion in the tank is brought about. In the embodiment of FIG. 9a, the tank is provided with at least one propeller agitator 70 or equivalent, by which at least the surface layer of black liquor is made to rotate in the tank 10. In FIG. 9b, it is shown how the tank is provided with at least one nozzle 72, which is fed with filtrate taken from the tank 10 by means of piping 74 and a pump 76. The number of agitators and nozzles is determined by both the size and shape of the tank and by the other dimensions of the agitators and nozzles. Also the vertical location of both the agitators and the nozzles is influenced by several factors. Firstly, the filtrate flow discharged from the circulation device must not mix the soap-containing surface layer of the filtrate, but it has to stay as stabile as possible, except for circulation in the tank. Secondly, partly for the above reason, agitators or nozzles have to be located clearly below the filtrate surface in all normal running situations of the tank. In other words, even when the level in the tank is at its lowest, the flow from the circulation device must not mix the soap layer. In theory, it would naturally be possible to arrange agitators or nozzles at various levels in the tank and only use the circulation equipment located on an appropriate level. Most probably, however, economical factors put a limit to such a solution. A remedy by which the discharge flow from the circulating equipment could be prevented from mixing the soap layer is a guide plate arranged on the tank wall above the agitators or nozzles, for directing the flow to be more precisely horizontal.

A way of utilizing a circulating flow brought about by agitators or nozzles is to arrange a guide plate or partition wall on the surface layer of the liquor, such guide plate or partition wall being spiral in shape and adjustable also vertically if desired. The guide plate preferably extends spirally from the tank wall as far the soap skimming device. Said plate may also be vertically adjustable if the liquor level varies greatly in the tank. The purpose of the plate is to enhance the tendency of light soap circulating in the tank to accumulate in the middle of the tank by leading the soap flow circulating on the liquor surface towards the middle of the tank or alternatively to a soap discharge equipment in general. The soap skimming device may be merely a substantially vertical pipe having an inlet opening for receiving soap into the pipe. Preferably the pipe has two portions so that the lower portion of the pipe is stationary and the upper portion telescopically sliding relative to the lower pipe portion. When the soap inlet opening is arranged in the upper portion of the pipe, the elevation of the upper portion of the pipe may be so adjusted that the soap sliding along the spiral guide plate towards the middle of the tank may be collected in the pipe. In accordance with a preferred embodiment of the invention, the lower end of the vertical pipe is provided with a cone, for growing the flow velocity of the soap in order to ease further pumping.

A still another way of generating a draw between the soap layer and the soap separation chute is to provide the tank with at least one doctor blade extending essentially to the soap layer or even therethrough. Such a doctor blade is rotated in the tank, for example, in the same way as the chute described in some embodiments above. In some circumstances, this arrangement can be recommended because, at least in large tanks, rotation of the chute may prove to be technically difficult, or at least expensive. A way of dimensioning the doctor is to make the doctor extend more or less through the soap layer so that the doctors wipe relatively near the chute when moving over it. Correspondingly, the chute has to be deeper so that the doctor, when passing by the chute, does not wipe soap from the chute.

Still some structural arrangements deserve to be mentioned. These may be used in some special applications. For example, if it is desired that a chute, especially a one-sided chute extending from the centerline of the tank to the wall thereof, moves horizontally in the filtrate tank, it is possible to support the chute against the tank wall, e.g., by a rail. This is done so that an outer edge of the chute is provided with a wheel, which rolls on the rail, thereby making the rotation of the chute in the tank possible. Another alternative is to suspend the outer edge of the chute on the tank wall, for example, in connection with a preferably annular rail arranged on rollers. In this case the rail itself is moved relative to the tank wall. The drive equipment of the chute, preferably an electric motor may be located in connection with the rail, whereby the motor itself stays in place and rotates the rail by means of, e.g., cogging of the rail. Alternatively, the drive equipment may be located at the outer edge of the chute, whereby the motor, by means of, e.g., cogging of the rail moves the chute relative to the rail which rail is stationary in relation to the tank. It is also possible to arrange the rotation of the chute through the center pipe of the tank. In that case, the rotating motor is either arranged to rotate the chute by telescopic pipes or it is suspended on the upper part of the tank, either on the cover of the tank or other structures at the upper part of the tank wherefrom the force rotating the chute is directed down to the chute via a shaft mounted centrally relative to the tank (disclosed in FIG. 3). All the arrangements described above are based on the cylindrical shape of the tank, which is the most common shape today. Furthermore, if the chute is not supported on floats, but the chute elevation is regulated electrically, the elevation of the support of the chute against the outer wall of the tank has to be adjustable as well. This is naturally possible, e.g., by arranging the structures supporting the outer end of the chute against vertical guide bars, whereby, at the same time when the dimension of the telescopic center pipe is changed, the elevation of the structures supporting the chute on the tank wall is changed correspondingly.

Although we have presented a large number of arrangements based on adjusting the elevation of the soap separating chute relative to the level of the filtrate in the tank, the present invention is also well applicable to such arrangements in which the soap level is kept constant in the tank. In such arrangements, it would be possible to adjust the level of the filtrate to an optimum, relative to the chute. Vertical movability of the chute would be in that case unnecessary. The substantially constant level of the filtrate can be brought about, e.g., by defining the amount of material entering the tank and by adjusting the amount of material being discharged from the tank to be substantially the same. Soap foam makes this adjustment nearly impossible, though. In any event, the primary basis of the present invention, i.e., to bring about a draw between the soap and the chute is still essential to the function of the apparatus.

In tests performed according to the invention some things have been noted which have given reason to review the forming mechanism of foam again. It has been noted, when observing the flow of foam at different points, that there is a high, bubbling foam column in the filtrate tank at the deaeration cylinder, although the flow entering the cylinder seems to be of fairly uniform quality and contain only a little of air. An explanation for this phenomenon is that the deaeration cylinder does not separate air from the filtrate but mixes it therewith. Depending on the dimensions of the cylinder, it is possible that a spiral flow forming in the cylinder is either so strong that it draws air inside it or so weak that no actual field of centrifugal force is formed, but the filtrate flows into the inner pipe of the cylinder and forms a heavily turbulent flow field in which air mixes with the filtrate. In both cases, the filtrate contains more air than what it did before entering the deaeration cylinder.

As a solution to this problem, it is suggested that the deaeration cylinder should be designed more carefully. It calls for re-dimensioning of the deaeration cylinder, which might lead to the pressurizing of the cylinder so that filtrate would be fed to the cylinder at a certain pressure and gas would be drawn therefrom by using an appropriate negative pressure arrangement. It is also possible to omit the inner deaeration cylinder altogether and bring the filtrate directly into the outer cylinder. A feeding device of a new type could be, e.g., a pipe with a relatively large diameter, the pipe running substantially on the level of the filtrate surface and having the upper surface provided with openings for discharging gas into the air space of the tank and the lower surface with larger openings for discharging filtrate among the filtrate already existing in the tank. If necessary, guide plates could be arranged below the filtrate discharge openings for directing the filtrate flow to the filtrate surface, so that soap would have enough time to separate from the filtrate and that the "fresh" filtrate wherefrom soap has not yet separated would remain on the surface of the filtrate.

As can be seen from the above description, an entirely novel structure of filtrate tanks has been developed, which structure is capable to eliminate all noted drawbacks of prior art apparatus.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for separating soap from liquor in a filtrate tank comprising:
   a filtrate tank,
   a device to introduce liquor into the filtrate tank,
   a soap separating assembly having a chute for separating a soap fraction from a liquor surface in the tank and connected to convey the soap fraction out of the tank, the chute comprising a lip portion mainly receiving the soap fraction,
   a device which brings the soap fraction accumulated on the surface of the liquor and the soap separating assembly into relative motion to each other by moving the soap separating assembly in such a manner to cause relative horizontal movement to occur between the chute thereof and the soap fraction accumulated on the surface of the liquor; and
   a discharge to remove the soap fraction from the tank.

2. An apparatus as recited in claim 1, wherein the device which moves the soap separating assembly comprises an electric or hydraulic motor, which is connected to a rotating shaft of the soap separating assembly.

3. An apparatus as recited in claim 1, wherein the lip portion is provided with a plurality of adjacent flow paths and flow obstacles.

4. An apparatus as recited in claim 3 wherein the lip portion is vertically wavelike, serrated, or provided with recesses.

5. An apparatus as recited in claim 1 which further comprises a maintaining device which maintains a reciprocal vertical state between the liquor surface FS and soap separating assembly substantially constant.

6. An apparatus as recited in claim 5 wherein the maintaining device changes the elevation of the soap separating assembly.

7. An apparatus as recited in claim 1 wherein the tank further comprises a device to maintain a reciprocal vertical state between the liquor surface FS and soap separating assembly substantially constant.

8. An apparatus as recited in claim 7 wherein the device to maintain the reciprocal vertical state comprises a device which elevates the soap separating assembly.

9. An apparatus as recited in claim 1 wherein the discharge further comprises pipe portions that move lengthwise relative to each other.

10. An apparatus for separating soap from liquor in a filtrate tank comprising:
    a filtrate tank,
    a device to introduce liquor into the filtrate tank,
    a soap separating assembly having a chute for separating a soap fraction from a liquor surface in the tank and connected to convey the soap fraction out of the tank, the chute comprising a lip portion mainly receiving the soap fraction,
    a device which brings the soap fraction accumulated on the surface of the liquor and the soap separating assembly into relative motion to each other by rotationally moving the soap separating assembly, and hence said chute thereof, relative to the soap fraction accumulated on the surface of the liquor; and
    a discharge to remove the soap fraction from the tank.

* * * * *